(12) United States Patent
Döbler et al.

(10) Patent No.: US 12,534,274 B2
(45) Date of Patent: *Jan. 27, 2026

(54) SPRINKLER WITH TAMPER EVIDENT FEATURE

(71) Applicant: Sonoco Development, Inc., Hartsville, SC (US)

(72) Inventors: Daniel Döbler, Münsingen (DE); Patrick Pfriem, Leipzig (DE)

(73) Assignee: Sonoco Development, Inc., Hartsville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/646,374

(22) Filed: Apr. 25, 2024

(65) Prior Publication Data

US 2024/0270453 A1    Aug. 15, 2024

Related U.S. Application Data

(63) Continuation of application No. 17/861,720, filed on Jul. 11, 2022, now Pat. No. 11,993,427.

(Continued)

(51) Int. Cl.
*B65D 47/08* (2006.01)
*B65D 47/26* (2006.01)

(52) U.S. Cl.
CPC ....... *B65D 47/0838* (2013.01); *B65D 47/265* (2013.01); *B65D 2401/15* (2020.05)

(58) Field of Classification Search
CPC .............. B65D 47/0838; B65D 47/265; B65D 2401/15; B65D 2517/0011; B65D 17/401

(Continued)

(56) References Cited

U.S. PATENT DOCUMENTS

| 2,961,132 A | 11/1960 | Ankney |
| 3,081,011 A | 3/1963 | Stull |

(Continued)

FOREIGN PATENT DOCUMENTS

| EP | 1547930 A1 | 6/2005 |
| KR | 101233020 B1 | 2/2013 |
| WO | 2010091885 A1 | 8/2010 |

OTHER PUBLICATIONS

International Search Report & Written Opinion related to Application No. PCT/S2022/036659; reported on Oct. 25, 2022.

(Continued)

*Primary Examiner* — James N Smalley
(74) *Attorney, Agent, or Firm* — von Briesen & Roper, s.c.

(57) ABSTRACT

A sprinkler assembly for a flowable product container includes a sprinkler base and a sprinkler disk rotatably coupled to the sprinkler base. The sprinkler base includes a tongue defined by a shear area and a tongue hinge, with the tongue extending upward when the shear area is unbroken, and partially detached and rotatable to an open position when force is applied to break the shear area. The sprinkler disk has a pour aperture with a complimentary shape to the tongue so that the tongue extends through the pour aperture to prevent rotation of the sprinkler disk when the shear area is unbroken and not tampered, and rotates downward when the shear area is broken to allow the rotation of the sprinkler disk. The sprinkler assembly may be fabricated from materials such as polyethylene and polyurethane.

15 Claims, 6 Drawing Sheets

Related U.S. Application Data (60) Provisional application No. 63/221,338, filed on Jul. 13, 2021.

(58) Field of Classification Search
USPC .................................................. 220/254.4
See application file for complete search history.

(56) References Cited

U.S. PATENT DOCUMENTS

| | | | |
|---|---|---|---|
| 4,274,563 A | 6/1981 | Otterson | |
| 4,489,864 A | 12/1984 | Davis | |
| 4,545,508 A | 10/1985 | Cribb, Jr. et al. | |
| 4,598,837 A | 7/1986 | Kreiseder | |
| 4,611,725 A | 9/1986 | Kacalieff | |
| 4,709,830 A | 12/1987 | Kreiseder | |
| 4,792,054 A | 12/1988 | Weidman | |
| 4,846,374 A | 7/1989 | Gabrys | |
| 4,969,572 A | 11/1990 | Vankerkhoven et al. | |
| 5,085,331 A | 2/1992 | Goya et al. | |
| 5,161,713 A | 11/1992 | English | |
| 5,167,338 A | 12/1992 | Kick | |
| 5,176,277 A | 1/1993 | Schuermann | |
| 5,205,430 A * | 4/1993 | Valyi | B65D 51/228 220/267 |
| 5,402,921 A | 4/1995 | Forsyth et al. | |
| 5,692,633 A * | 12/1997 | Gordon | B65D 17/401 220/268 |
| 7,374,053 B2 | 5/2008 | Herald | |
| 8,579,116 B2 | 11/2013 | Pether | |
| 8,720,740 B2 * | 5/2014 | Bratsch | B65D 17/4014 220/253 |
| 8,955,705 B2 * | 2/2015 | Vogel | B65D 47/265 220/253 |
| 9,586,735 B2 | 3/2017 | Jensen | |
| 2002/0079339 A1 | 6/2002 | Sheffer et al. | |
| 2003/0080130 A1 * | 5/2003 | Goetz | B65D 17/401 222/548 |
| 2010/0059516 A1 * | 3/2010 | Parker | B65D 51/225 220/268 |

OTHER PUBLICATIONS

Supplementary European Search Report related to Application No. EP22842702; reported on Mar. 28, 2025.

\* cited by examiner

SPRINKLER WITH TAMPER EVIDENT FEATURE

CROSS-REFERENCE TO RELATED APPLICATION

This application is a continuation of pending U.S. application Ser. No. 17/861,720, filed Jul. 11, 2022, which claims priority to U.S. Provisional Patent Application Ser. No. 63/221,338, filed on Jul. 13, 2021, which application is expressly incorporated by reference herein.

TECHNICAL FIELD

The present disclosure relates generally to product containers for holding and dispensing powdered, chopped or other flowable products and, more particularly, to sprinkler for a powdered product container having a semi-detachable tongue that is initially secured by a tamper evident feature.

BACKGROUND

Containers for holding and dispensing powdered, chopped or other flowable products such as seasonings like salt, pepper, chopped spices and herbs and the like are known. Such containers may be configured with multiple opening modes for controlling the manner of dispensing the flowable product. Consequently, a single container may allow for the flowable product to be poured freely out of the container when a relatively large amount of the product is dispensed, or to be dispensed more slowly such as by sifting when smaller amounts of the product are needed. The containers are typically sealed prior to conveyance to a customer to prevent tampering or tainting of the products before use, and have a release or unsealing mechanism that is broken or otherwise opened by the customer in order to dispense the product.

Some containers are designed to be fabricated from polystyrene (PS) and provided with perforations defining an access portion that can be punched out to open the container. Brittleness of the PS facilitates breaking along the perforations to partially or fully detach the access portion. While these designs are effective with PS, they may not be eco-friendly, and some jurisdictions are moving to ban the use of PS in products. Alternative polymer materials such as polyethylene (PE) and polypropylene (PP) are recyclable, but may not be compatible with PS-specific container designs because they are less brittle than PS and may not break in the same manner as perforated PS containers.

SUMMARY OF THE DISCLOSURE

In one aspect of the present disclosure, a sprinkler assembly for a flowable product container is disclosed. The sprinkler assembly may include a sprinkler base having a tongue defined by a shear area and a tongue hinge, wherein the tongue extends upward from the sprinkler base when the shear area is unbroken. The sprinkler assembly may further include a sprinkler disk having a pour aperture defined therethrough, wherein the sprinkler disk is rotatably coupled to the sprinkler base. The pour aperture may receive the tongue before the shear area is broken to prevent rotation of the sprinkler disk relative to the sprinkler base, and the tongue may rotate downward when the shear area is broken to allow rotation of the sprinkler disk relative to the sprinkler base.

In another aspect of the present disclosure, a flowable product container for a flowable product is disclosed. The flowable product container may include a product canister having a canister upper end, and a sprinkler base engaging the canister upper end of the product canister to retain the flowable product within the flowable product container. The sprinkler base may have a tongue defined by a shear area and a tongue hinge, wherein the tongue extends upward from the sprinkler base when the shear area is unbroken. The flowable product container may further include a sprinkler disk having a pour aperture defined therethrough. The disk body may be rotatably coupled to the sprinkler base. The pour aperture may receive the tongue before the shear area is broken to prevent rotation of the sprinkler disk relative to the sprinkler base, and the tongue may rotate downward when the shear area is broken to allow the rotation of the sprinkler disk relative to the sprinkler base.

Additional aspects are defined by the claims of this patent.

DETAILED DESCRIPTION

Figure 1:
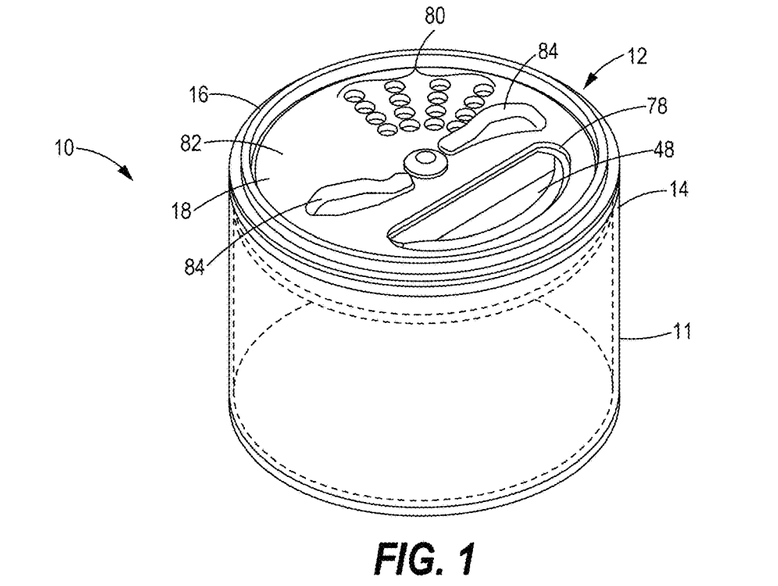
FIG. 1 is an isometric view of a container for flowable products having a sprinkler assembly in accordance with the present disclosure.

FIG. 1 illustrates a flowable product container 10 having a product canister 11 and a sift and pour sprinkler assembly 12 in accordance with the present disclosure installed thereon. The sprinkler assembly 12 may be designed for fabrication from polymer material such as PE, PP and the like. The sprinkler assembly 12 is attached at an open canister upper end 14 of the product canister 11 to contain a flowable product disposed within the container 10. The sprinkler assembly 12 is illustrated includes a sprinkler base 16 having a sprinkler disk 18 rotatably mounted thereon. In one embodiment, the sprinkler base 16 and the sprinkler disk 18 are fabricated individually via injection molding of PE or PP, and subsequently assembled as discussed further below.

Figure 2:
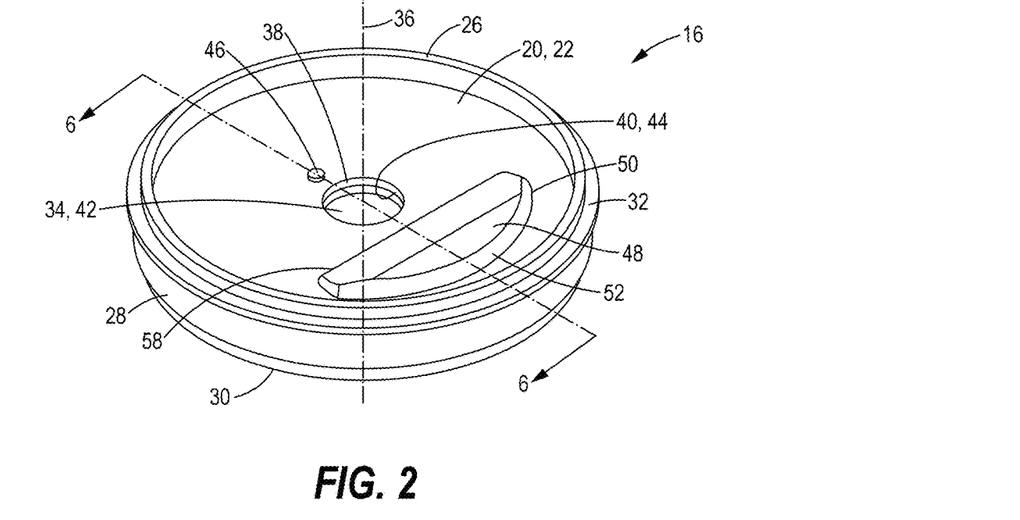
FIG. 2 is a top isometric view of a sprinkler base of the sprinkler assembly of FIG. 1.
Figure 3:
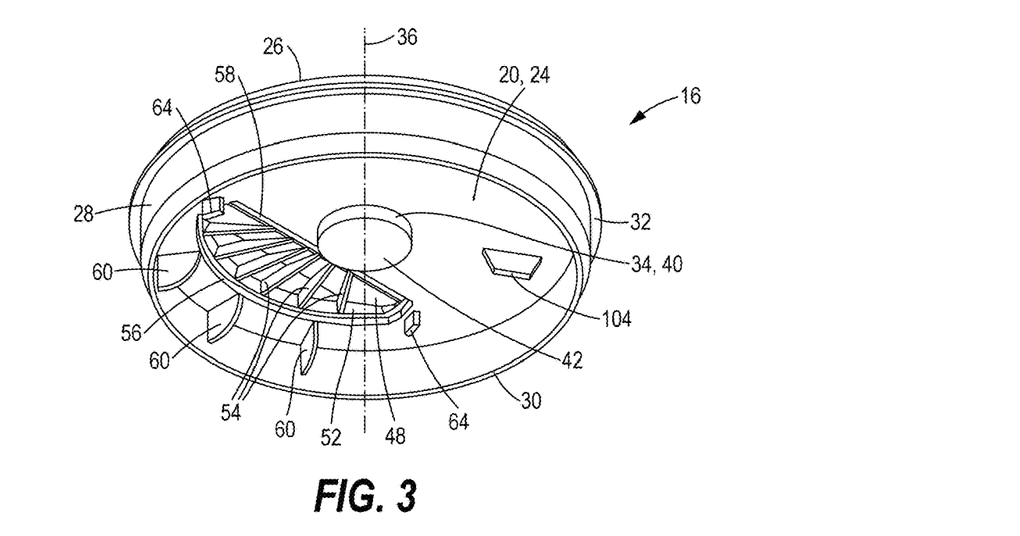
FIG. 3 is a bottom isometric view of the sprinkler base of FIG. 2.

The embodiment of the sprinkler base 16 is illustrated in greater detail in FIGS. 2-6. Referring to FIGS. 2 and 3, the illustrated sprinkler base 16 includes a circular base plate 20 with a base top surface 22 and a base bottom surface 24, an annular containment shoulder 26 extending upward from the base top surface 22, and an annular container insert cylinder 28 extending downward from the base bottom surface 24. The containment shoulder 26 encircles the sprinkler disk 18 after attachment, and provides a barrier to limit spillage of the flowable product ending up on the sprinkler disk 18 and the base top surface 22. The container insert cylinder 28 has a tapered outer wall configured with a maximum outer diameter that is slightly greater than an inner diameter at the canister upper end 14 of the product canister 11 to form a seal to prevent leakage of the flowable product when the container insert cylinder 28 is press fit into the canister upper end 14. The tapered outer wall of the container insert cylinder 28 may have a minimum outer diameter at a bottom end 30 that is smaller than the inner diameter at the canister upper end 14. The bottom end 30 may inserted into the canister upper end 14 and the sprinkler base 16 pressed downward until the canister upper end 14 is engaged by an annular base flange 32 of the sprinkler base 16 that extends radially outward between the containment shoulder 26 and the container insert cylinder 28.

Figure 4:
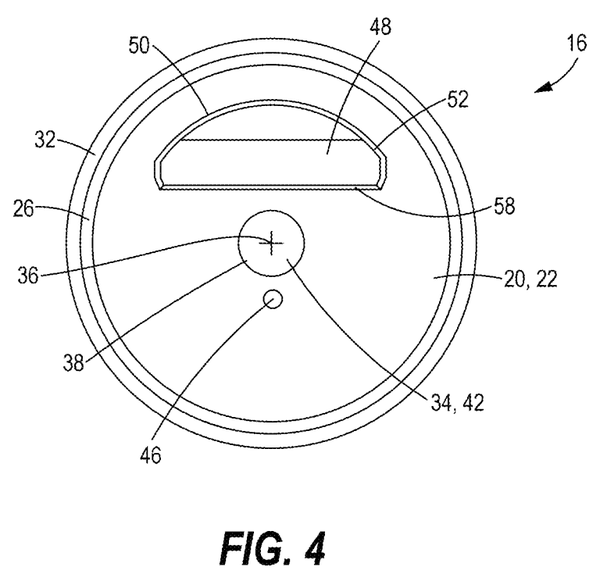
FIG. 4 is a top view of the sprinkler base of FIG. 2.
Figure 5:
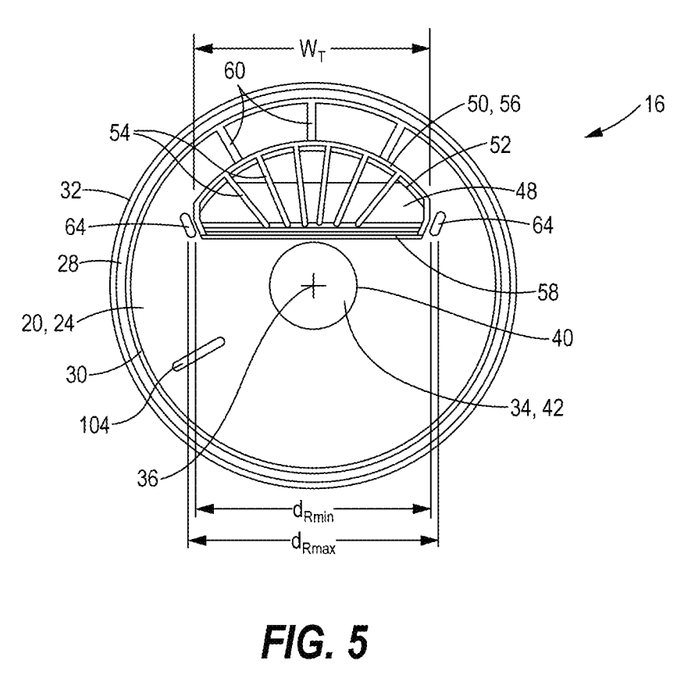
FIG. 5 is a bottom view of the sprinkler base of FIG. 2.

The base plate 20 is a circular disk to which the sprinkler disk 18 is secured. The base plate 20 may be configured for attachment and indexing of the sprinkler disk 18, and to create an opening for dispensing the flowable product after a consumer purchases the flowable product container 10. The base top surface 22 has an annular disk connection housing 34 located on a base central axis 36 of the sprinkler base 16 and concentric with the containment shoulder 26 (FIG. 4) and the container insert cylinder 28 (FIG. 5). As shown in the cross-sectional view of FIG. 6, the disk connection housing 34 may extend downward from the base bottom surface 24 and from a housing opening 38 through the base plate 20. The disk connection housing 34 may include a cylindrical housing outer wall 40 extending downward from the base bottom surface 24 and a housing bottom wall 42 closing the end of the housing outer wall 40 opposite the housing opening 38. An inner surface of the housing outer wall 40 may define a locking groove 44 having a larger inner diameter than an inner diameter of the housing opening 38 for retentive engagement of the sprinkler disk 18 after assembly as discussed further below.

The base plate 20 further includes an indexing detent 46 and a tongue 48 that may be disposed on diametrically opposite sides of the base central axis 36 of the base plate 20 as shown. In alternate embodiments, the indexing detent 46 and the tongue 48 may have different relative positions on the base plate 20, but will be located radially outward from the base central axis 36 on the base plate 20. The indexing detent 46 extends upward from the base top surface 22. The indexing detent 46 is positioned to radially align with corresponding indexing recesses of the sprinkler disk 18 when the sprinkler disk 18 is attached to the sprinkler base 16 to alternately open and close the flowable product container 10 when the sprinkler disk 18 is rotated relative to the sprinkler base 16 as discussed further below.

Figure 6:
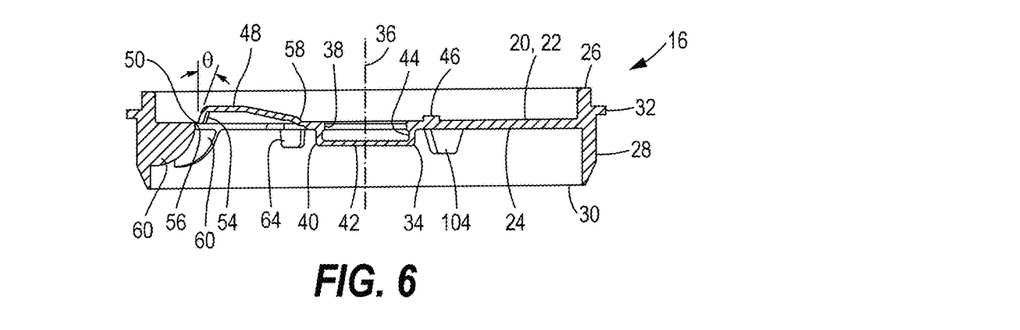
FIG. 6 is a cross-sectional view of the sprinkler base taken through line 6-6 of FIG. 2.
Figure 7:
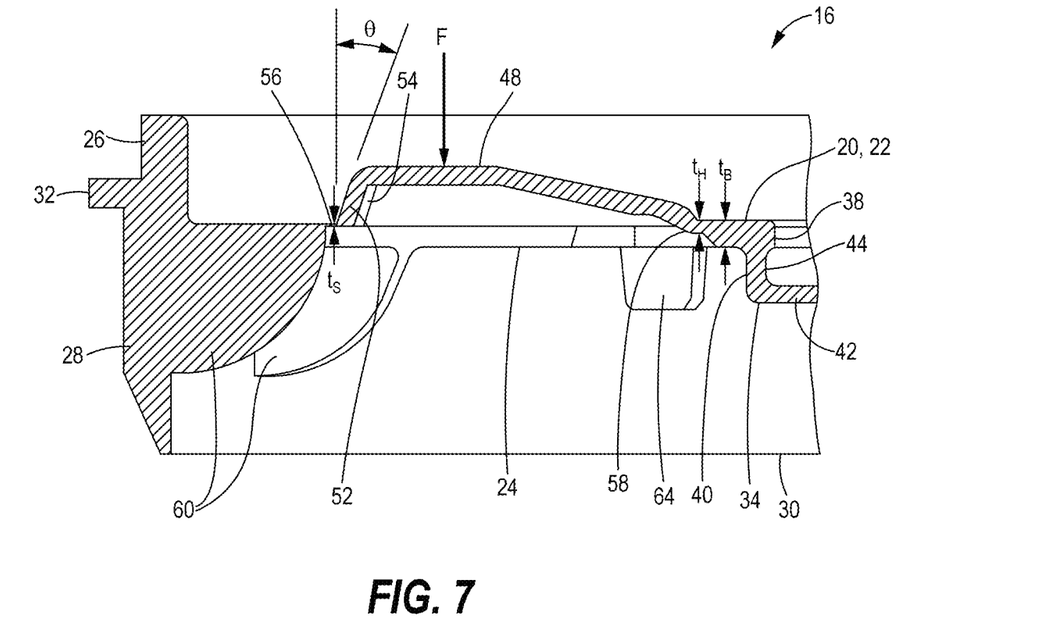
FIG. 7 is an enlarged cross-sectional view of a portion of the sprinkler base of FIG. 6.

The tongue 48 is integrally formed in the base plate 20 and configured to be partially detached from the base plate 20 when a sufficient downward force is applied as described further below. The tongue 48 may have an eccentric position on the base plate 20 that is between the housing opening 38 and the containment shoulder 26 (FIGS. 4 and 5). The tongue 48 may have an approximately semi-circular shape within a plane of the base plate 20. As best seen in FIGS. 6 and 7, the tongue 48 in cross-section has a generally concave or raised dome shape and extends upward above the base top surface 22. At a radially outward front edge 50 of the tongue 48, a shearing surface 52 may extend upward from the base top surface 22. The shearing surface 52 may extend vertically upward parallel to the base central axis 36, or may have a cutter angle θ wherein the shearing surface 52 extends radially inward toward the base central axis 36 as it extends upward from the base top surface 22. The cutter angle θ may range from 0° up to a maximum value of 20°±1°. The structure of the tongue 48 may be reinforced by a plurality of tongue ribs 54 on the concave side of the tongue 48 that may prevent the tongue 48 from collapsing when a downward force is applied to the tongue 48.

The base plate 20 may have a generally constant base thickness $t_B$ that is within a range from 0.50 mm to 1.00 mm±0.05 mm for a majority of the base plate 20, but may include a shear area 56 at the outward front edge 50 of the tongue 48 that has a shear thickness $t_S$ that is less than the base thickness $t_B$, and may have a value that is within a range from 0.03 mm to 0.10 mm±0.01 mm. The shear area 56 may also have a shear width $w_S$ that is within a range from 0.03 mm±0.01 mm to 0.20 mm±0.05 mm. A tongue hinge 58 may be formed at a radially inward edge of the tongue 48. The tongue hinge 58 may have a hinge thickness $t_H$ that is less then the base thickness $t_B$ and greater than the shear thickness $t_S$. In one embodiment, the hinge thickness $t_H$ may be equal to 0.30 mm±0.05 mm.

Figure 8:
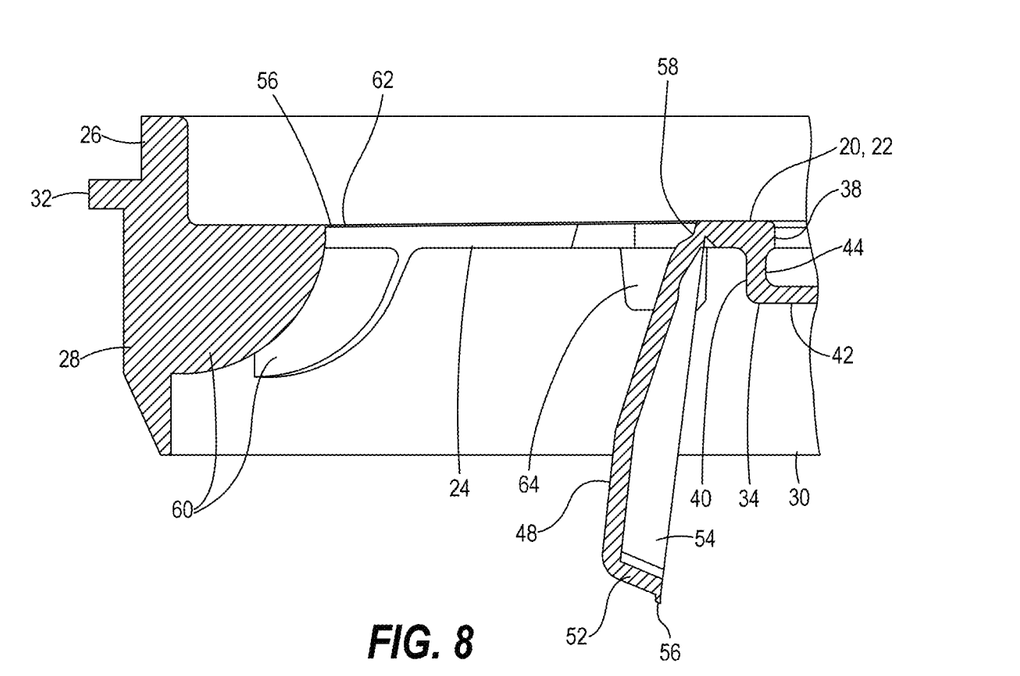
FIG. 8 is the enlarged cross-sectional view of the portion of the sprinkler base with a tongue partially detached to define a product dispensing opening.

The arrangement of the tongue 48, the shear area 56 and the tongue hinge 58 facilitates partial detachment of the tongue 48 by the consumer to open the flowable product container 10 after purchase to dispense the product. When a downward force F is applied to the tongue 48 as shown in FIG. 7, the tongue 48 functions as a moment arm to transfer the force F to the shearing surface 52 at the outward front edge 50 to apply a shear force at the shear area 56. The portion of the base plate 20 between the tongue 48 and the containment shoulder 26 may be supported by a plurality of gussets 60 connecting the base bottom surface 24 to a cylindrical inner surface of the container insert cylinder 28 to prevent that portion of the base plate 20 from collapsing when the force F is applied. When the downward force F is sufficient, the shearing surface 52 breaks through the material at the shear area 56 to partially detach the tongue 48 along the outward front edge 50. Due to the reduced hinge thickness $t_H$, the tongue 48 does not completely detach from the base plate 20, and instead rotates downward about the tongue hinge 58 and into the flowable product container 10 as shown in FIG. 8. With the tongue 48 partially detached, the remaining portion of the shear area 56 and the tongue hinge 58 define a product dispensing opening 62 through the base plate 20.

In some embodiments, the tongue 48 may be left free to dangle below the base bottom surface 24. Alternatively, in the illustrated embodiment, the base plate 20 includes a pair of locking ribs 64 extending downward from the base bottom surface 24 on either side of the tongue 48. Referring to FIG. 5, the tongue 48 may have a maximum tongue width $w_T$ at the outer perimeter defined by the outward front edge 50. The locking ribs 64 are located on either side of the tongue 48, and are angled relative to each other so that the locking ribs 64 are spaced by a maximum rib distance $d_{Rmax}$ at an outward end closest to the container insert cylinder 28 and by a minimum rib distance $d_{Rmin}$ closest to the base central axis 36. The maximum tongue width $w_T$ is less than the maximum rib distance $d_{Rmax}$ and greater than the minimum rib distance $d_{Rmin}$. With this arrangement, the tongue 48 will rotate downward and rearward about the tongue hinge 58 until the rib distance $d_R$ is less than the maximum tongue width $w_T$ and the tongue 48 is wedge between the locking ribs 64 to hold the tongue 48 in the open position shown in FIG. 8.

Figure 9:
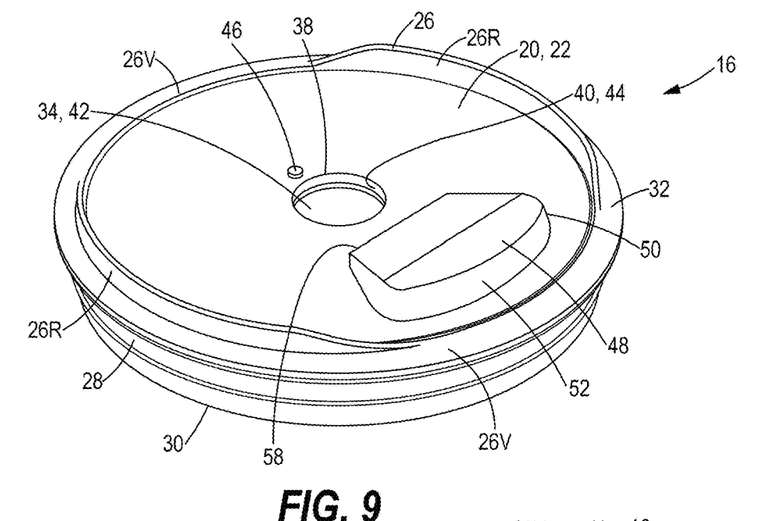
FIG. 9 is a top isometric view of an alternative embodiment of a sprinkler base of the sprinkler assembly of FIG. 1.
Figure 10:
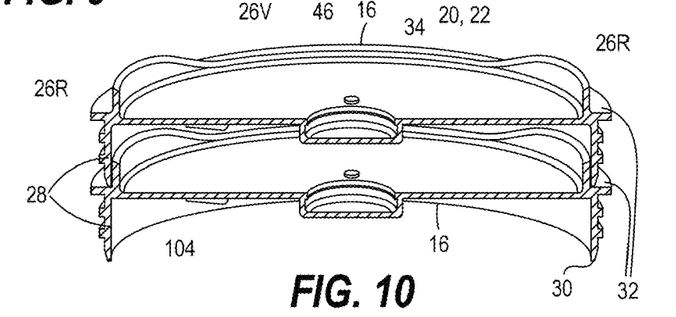
FIG. 10 is a side cross-sectional view of a stack of the sprinkler bases of FIG. 9.

The configuration of the sprinkler base 16 illustrated in FIGS. 2-8 is exemplary, and alternative configurations are contemplated by the inventors. For example, FIG. 9 illustrates an alternative embodiment where the containment shoulder 26 is configured for efficient stacking of sprinkler bases 16. In this embodiment, the containment shoulder 26 includes lateral raised portions 26R arranged on opposite sides of the tongue 48. The raised portions 26R may be separated by valley portions 26V having a reduced height and being relatively close to flush with the base top surface 22. As shown in the cross-sectional view of FIG. 10 where a pair of sprinkler bases 16 are stacked on top of each other, the containment shoulder may have a shoulder outer diameter that is less than an insert cylinder inner diameter of the container insert cylinder 28. During stacking, the raised portions 26R of the containment shoulder 26 may be received by the container insert cylinder 28 of the adjacent sprinkler base 16. When the sprinkler bases 16 are separated, air can enter the space between the sprinkler bases 16 through the valley portions 26V of the containment shoulder 26 to avoid creating a vacuum or pressure drop in the space that may resist separation as may occur where the containment shoulder 26 has a uniform height such as that illustrated in FIGS. 2-8.

Figure 11:
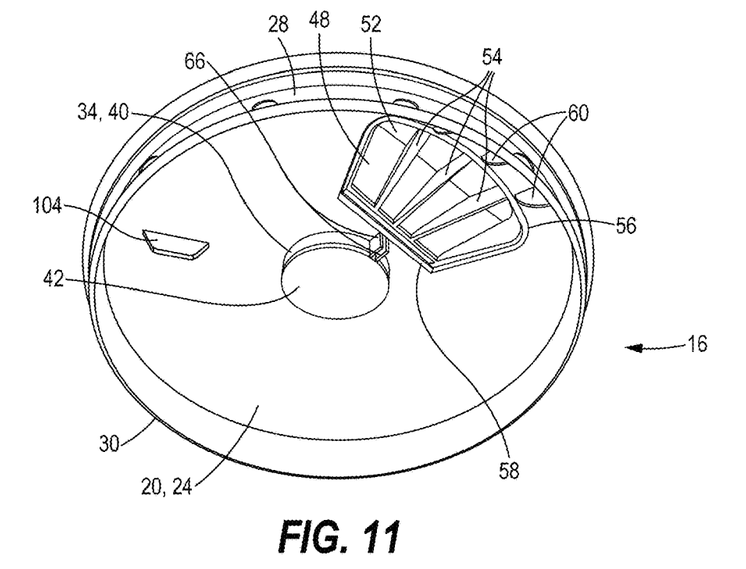
FIG. 11 is a bottom isometric view of a further alternative embodiment of a sprinkler base of the sprinkler assembly of FIG. 1.

Another alternative embodiment of the sprinkler base 16 is illustrated in FIG. 11 where the bottom of the sprinkler base 16 is shown. In this embodiment, the locking ribs 64 engaging the lateral edges of the tongue 48 may be replaced by a pair of locking ribs 66 for engaging and locking the tongue 48 after partial detachment and rotation about the tongue hinge 58 to the open position. The pair of locking ribs 66 may extend downward from the base bottom surface 24 and outward from the housing outer wall 40 in the direction of the tongue 48. The locking ribs 66 may have a locking rib gap therebetween and be spaced apart by a gap width that is less than a tongue rib thickness of a central tongue rib 54 with which the locking rib gap is aligned. When the tongue 48 is partially detached and rotated about the tongue hinge 58 to the open position, the tongue rib 54 may be received in the locking rib gap and engaged by the locking ribs 66 to secure the tongue 48 in the open position. Further alternative arrangements of the sprinkler base 16 are contemplated by the inventors as having use in sprinkler assemblies 12 in accordance with the present disclosure.

Figure 12:
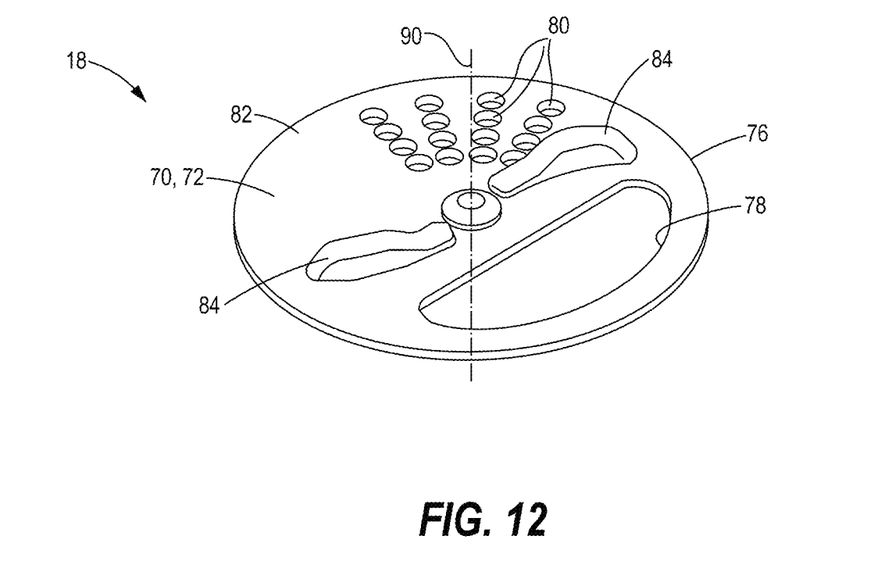
FIG. 12 is a top isometric view of a sprinkler disk of the sprinkler assembly of FIG. 1.
Figure 13:
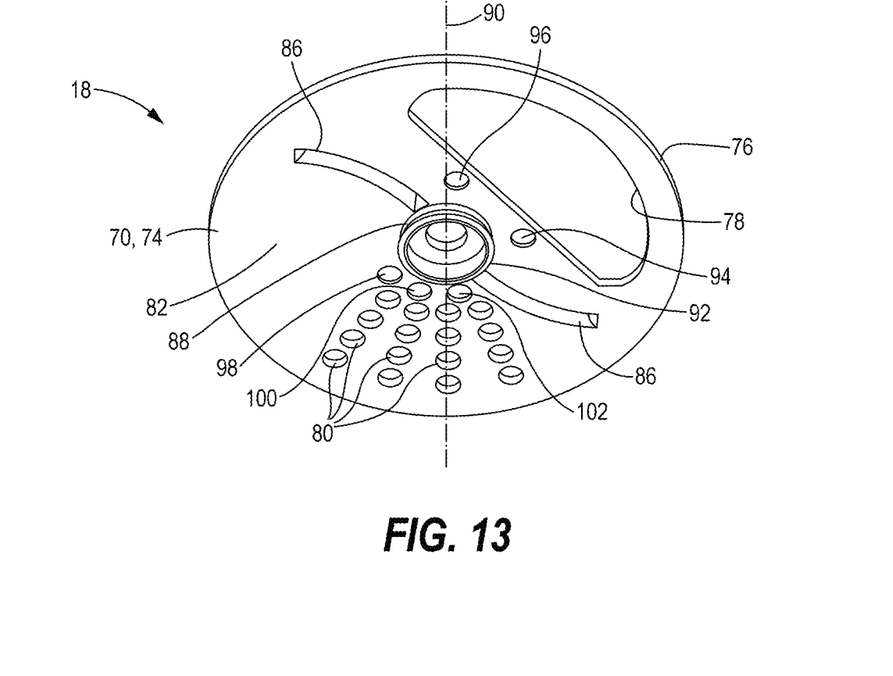
FIG. 13 is a bottom isometric view of the sprinkler disk of FIG. 12.

The sprinkler disk 18 is illustrated in greater detail in FIGS. 12 and 13. Referring to FIG. 12, the sprinkler disk 18 is formed as a circular disk body 70 having a disk top surface 72, a disk bottom surface 74 and a disk outer edge 76. The disk body 70 may be configured to provide a plurality of modes for dispensing the flowable product from the container 10. In the illustrated embodiment, the disk body 70 is configured for a pour dispensing mode and a sift dispensing mode. For the pour dispensing mode, a pour aperture 78 is defined through a portion of the disk body 70 proximate the disk outer edge 76. The sift dispensing mode is facilitated by a plurality of sift apertures 80 through a portion of the disk body 70 remote from the pour aperture 78. The pour aperture 78 will dispensed larger amounts of the flowable product than the sift apertures 80. A cover portion 82 of the disk body 70 does not have apertures therethrough and will function to close the container 10 as discussed further below. To facilitate rotation of the sprinkler disk 18 when mounted to the sprinkler base 16, one or more grips 84 may extend upward from the disk top surface 72 to provide surfaces for applying torque to rotate the sprinkler disk 18 relative to the sprinkler base 16.

The disk bottom surface 74 is illustrated in greater detail in FIG. 13. The pour aperture 78 and the sift apertures 80 extend through the disk body 70 from the disk top surface 72 to the disk bottom surface 74. To reduce weight and material, and to facilitate the injection molding process, the grips 84 may be hollow and have grip openings 86 through the disk bottom surface 74. The sprinkler disk 18 further includes a cylindrical mounting boss 88 extending downward from the disk bottom surface 74. The mounting boss 88 is located on a disk central axis 90 of the sprinkler disk 18 and concentric with the disk outer edge 76. The mounting boss 88 includes an annular locking rib 92 extending radially outward from an outer surface proximate an end distal to the disk bottom surface 74. The locking rib 92 may have a rib outer diameter that is greater than an inner diameter of the housing opening 38 and less than an inner diameter of the locking groove 44 so that the mounting boss 88 will be received by and retained within the disk connection housing 34 of the sprinkler base 16 as discussed further below.

The sprinkler disk 18 may be further configured to index the apertures 78, 80 and the cover portion 82 as the sprinkler disk 18 rotates on the sprinkler base 16. A plurality of indexing recesses 94-102 are defined in the disk bottom surface 74 and are configured to receive indexing detent 46 of the sprinkler base 16. A cover indexing recess 94 is positioned diametrically opposite the cover portion 82 and a sift indexing recess 96 is diametrically opposite the sift apertures 80. A first pour indexing recess 98 is diametrically opposite the pour aperture 78, and additional pour indexing recesses 100, 102 are circumferentially offset from the first pour indexing recess 98. The plurality of pour indexing recesses 98-102 may be provided to vary an amount of overlap between the pour aperture 78 and the product dispensing opening 62 so the size of the opening through which the flowable product can be poured can be varied to control dispensing of the flowable product.

INDUSTRIAL APPLICABILITY

Figure 14:
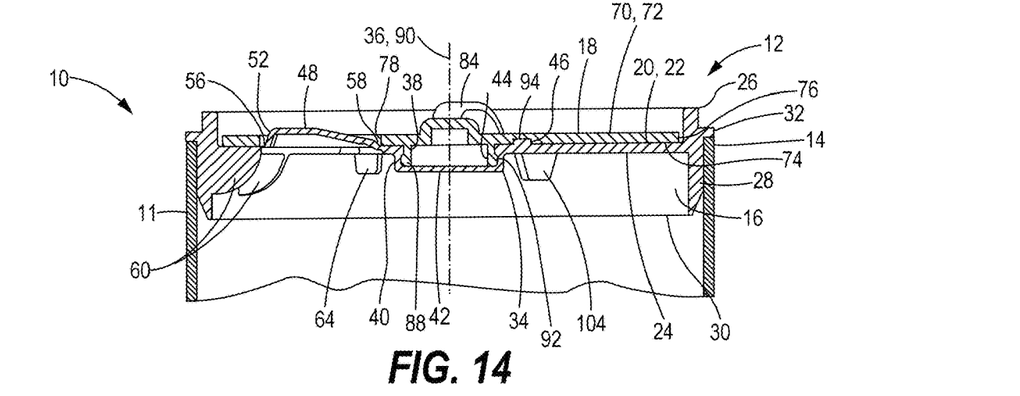
FIG. 14 is a partial cross-sectional view of an upper portion of the powdered product container of FIG. 1.

FIGS. 1 and 14 illustrate the flowable product container 10 after the sprinkler assembly 12 is assembled and installed. As shown in FIG. 14, the mounting boss 88 has been press fit into the disk connection housing 34 by forcing the locking rib 92 past the housing opening 38 and into the locking groove 44. The mounting boss 88 cannot easily be pulled out of the disk connection housing 34 to detach the sprinkler disk 18 from the sprinkler base 16, but the connection is loose enough to allow rotation of the sprinkler disk 18 relative to the sprinkler base 16. Initially, the tongue 48 is fully connected to the base plate 20 and extends upward from the base top surface 22. The tongue 48 and the pour aperture 78 have complimentary shapes so that the pour aperture 78 is disposed around the tongue 48 when the sprinkler assembly 12 is assembled and prior to the partial detachment of the tongue 48. The sprinkler base 16 may include base orientation rib 104 extending downward from the base bottom surface 24 that is used to position the sprinkler base 16 during an automated assembly process so that the tongue 48 and the pour aperture 78 are aligned when the sprinkler disk 18 is pressed down into engagement with the sprinkler base 16.

Figure 15:
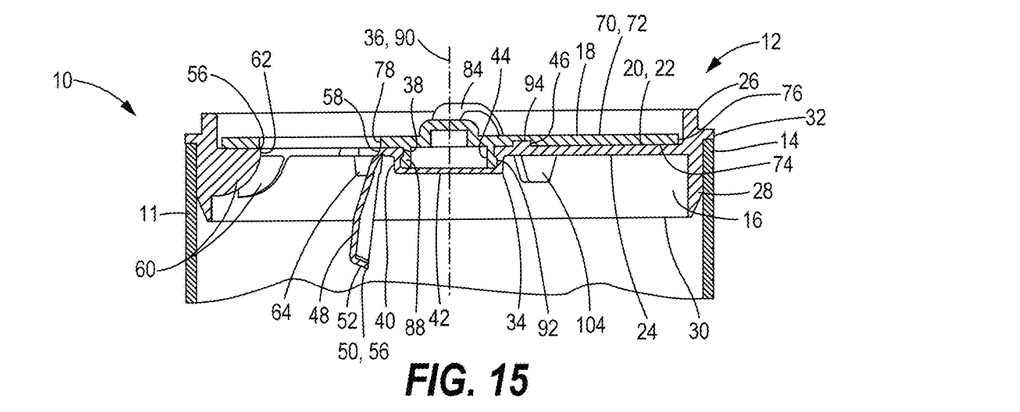
FIG. 15 is the partial cross-sectional view of an upper portion of the flowable product container of FIG. 1 with the tongue partially detached to define the product dispensing opening.

With the tongue 48 extending above the base top surface 22, rotation of the sprinkler disk 18 is substantially prevented to provide visual and tactile evidence that the flowable product container has not been subjected to tampering. After a consumer purchases the flowable product container 10, they may apply the downward force F to partially detach the tongue 48 as discussed above. After the tongue 48 is partially detached and engaged by the tongue ribs 54 as shown in FIG. 15, the tongue 48 will no longer obstruct the sprinkler disk 18 from rotating. FIGS. 14 and 12 also illustrate the complimentary relationship between the indexing detent 46 and the indexing recesses 94-102. As shown, the indexing detent 46 may have a detent' height and a detent outer diameter, and the indexing recesses 94-102 may have a recess depth and a recess inner diameter, that allow the indexing detent 46 to be received into each of the indexing recesses 94-102 when the indexing recesses 94-102 are circumferentially aligned with the indexing detent 46. The pour aperture 78 is fully aligned with the tongue 48 and the product dispensing opening 62 when the indexing detent 46 is circumferentially aligned with and received by the first pour indexing recess 98 as shown. The sprinkler disk 18 may be rotated until the second pour indexing recess 100 or the third indexing recess 102 are aligned with and receive the indexing detent 46 to adjust the amount of overlap between the product dispensing opening 62 and the pour aperture 78 to control the amount and the rate of pouring the flowable product. The sprinkler disk 18 will be rotated further to align the sift indexing recess 96 with the indexing detent and the sift apertures 80 with the product dispensing opening 62 to sift the flowable product from the container 10. Finally, rotating the sprinkler disk 18 to align the cover indexing recess 94 with the indexing detent 46 will align the cover portion 82 with the product dispensing opening 62 to close the container 10 and prevent discharge of the flowable product.

The sprinkler assembly 12 in accordance with the present disclosure provides an eco-friendly solution as a substitute for prior sprinklers fabricated from PS, which may be banned from recycling in some jurisdictions. In one embodiment, the sprinkler base 16 ifs fabricated from PP and the sprinkler disk 18 is fabricated from either PP or PE. Materials such as PP and PE do not require perforations for partial detachment of the tongue 48. The disclosed design takes advantage of the ability of such materials to be separated by shear forces. Consequently, the tongue 48 is secured to the base plate 20 without perforation openings so that the flowable product is sealed within the flowable product container 10 until the consumer partially detaches the tongue 48.

Freshness and retention of the flowable product is further ensured by the disk connection housing 34. In previous sprinkler assemblies, sprinkler bases were provided with central openings through which mounting bosses were inserted. Due to tolerances in manufacturing the sprinkler assemblies, gaps may exist between the central openings and the mounting bosses that would allow migration of vapor or oxygen into the previous containers and into the flowable product prior to purchase and opening by the consumer, and leakage of the flowable product from the container. In the design in accordance with the present disclosure, the disk connection housing 34 completely encloses the housing opening 38 to seal the container 10 prior to partially detaching the tongue 48, and to eliminate any leakage from the container 10 at the point of connection between the sprinkler base 16 and the sprinkler disk 18. After the tongue 48 is partially detached to open the container 10, flowable product can only be dispensed from the container 10 through the product dispensing opening 62 when either the pour aperture 78 or the sift apertures 80 are aligned therewith.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A sprinkler assembly for a flowable product container, comprising:
    a sprinkler base having a tongue defined by a shear area and a tongue hinge, wherein the tongue extends upward from the sprinkler base when the shear area is unbroken; and
    a sprinkler disk having a disk body and a pour aperture defined through the disk body, wherein the sprinkler disk is rotatably coupled to the sprinkler base, wherein the pour aperture receives the tongue before the shear area is broken to prevent rotation of the sprinkler disk relative to the sprinkler base, and wherein the tongue rotates downward when the shear area is broken to allow rotation of the sprinkler disk relative to the sprinkler base,
    wherein the sprinkler base comprises a housing opening centered on a base central axis, and wherein the sprinkler disk comprises a boss extending downward from the sprinkler disk and centered on a disk central axis, wherein the boss is inserted into the housing opening to rotatably couple the sprinkler disk to the sprinkler base,
    wherein the sprinkler base comprises a disk connection housing extending downward at the housing opening, wherein the disk connection housing receives and engages the boss to rotatably couple the sprinkler disk to the sprinkler base, and
    wherein the disk connection housing comprises an annular housing outer wall defining a locking groove, wherein the boss comprises an annular locking rib that is received within the locking groove and engaged by the housing outer wall to rotatably couple the sprinkler disk to the sprinkler base.

2. The sprinkler assembly according to claim 1, wherein the disk connection housing comprises a housing bottom closing a bottom end of the housing outer wall such that a flowable product within the flowable product container cannot be dispensed through the housing opening.

3. A sprinkler assembly for a flowable product container, comprising:
a sprinkler base having a tongue defined by a shear area and a tongue hinge, wherein the tongue extends upward from the sprinkler base when the shear area is unbroken; and
a sprinkler disk having a disk body and a pour aperture defined through the disk body, wherein the sprinkler disk is rotatably coupled to the sprinkler base, wherein the pour aperture receives the tongue before the shear area is broken to prevent rotation of the sprinkler disk relative to the sprinkler base, and wherein the tongue rotates downward when the shear area is broken to allow rotation of the sprinkler disk relative to the sprinkler base,
wherein the sprinkler base comprises a pair of locking ribs extending downward from a base bottom surface and engaging the tongue when the tongue is rotated about the tongue hinge to retain the tongue in an open position.

4. The sprinkler assembly according to claim 3, wherein the tongue has a tongue width and the tongue is rotated downward until a rib distance between the pair of locking ribs is less than the tongue width and the tongue is wedged between the pair of locking ribs.

5. The sprinkler assembly according to claim 4, wherein the rib distance has a maximum rib distance that is greater than the tongue width and a minimum rib distance that is less than the tongue width.

6. A sprinkler assembly for a flowable product container, comprising:
a sprinkler base having a tongue defined by a shear area and a tongue hinge, wherein the tongue extends upward from the sprinkler base when the shear area is unbroken; and
a sprinkler disk having a disk body and a pour aperture defined through the disk body, wherein the sprinkler disk is rotatably coupled to the sprinkler base, wherein the pour aperture receives the tongue before the shear area is broken to prevent rotation of the sprinkler disk relative to the sprinkler base, and wherein the tongue rotates downward when the shear area is broken to allow rotation of the sprinkler disk relative to the sprinkler base,
wherein the tongue comprises a tongue rib on a concave side of the tongue, wherein the sprinkler base comprises a pair of locking ribs extending downward from a base bottom surface and engaging the tongue rib when the tongue is rotated about the tongue hinge to retain the tongue in an open position.

7. The sprinkler assembly according to claim 6, wherein the tongue rib has a tongue rib thickness and the pair of locking ribs are spaced apart by a gap width that is less than the tongue rib thickness so that the tongue rib is wedged between the pair of locking ribs to retain the tongue in the open position.

8. A sprinkler assembly for a flowable product container, comprising:
a sprinkler base having a tongue defined by a shear area and a tongue hinge, wherein the tongue extends upward from the sprinkler base when the shear area is unbroken; and
a sprinkler disk having a disk body and a pour aperture defined through the disk body, wherein the sprinkler disk is rotatably coupled to the sprinkler base, wherein the pour aperture receives the tongue before the shear area is broken to prevent rotation of the sprinkler disk relative to the sprinkler base, and wherein the tongue rotates downward when the shear area is broken to allow rotation of the sprinkler disk relative to the sprinkler base,
wherein the sprinkler base comprises an indexing detent extending upward from a base top surface, wherein the sprinkler disk comprises a cover indexing recess and a first pour indexing recess defined in a disk bottom surface, wherein the product dispensing opening is covered by the disk body when the cover indexing recess receives the indexing detent, and wherein the pour aperture is aligned with the product dispensing opening when the first pour indexing recess receives the indexing detent.

9. The sprinkler assembly according to claim 8, wherein the sprinkler disk comprises a second pour indexing recess defined in the disk bottom surface and the pour aperture is partially aligned with the product dispensing opening when the second pour indexing recess receives the indexing detent.

10. The sprinkler assembly according to claim 8, wherein the sprinkler disk comprises a plurality of sift apertures defined therethrough and a sift indexing recess defined in the disk bottom surface, wherein each of the plurality of sift apertures is smaller than the pour aperture, and wherein the plurality of sift apertures are aligned with the product dispensing opening when the sift indexing recess receives the indexing detent.

11. A sprinkler assembly for a flowable product container, comprising:
a sprinkler base having a tongue defined by a shear area and a tongue hinge, wherein the tongue extends upward from the sprinkler base when the shear area is unbroken; and
a sprinkler disk having a disk body and a pour aperture defined through the disk body, wherein the sprinkler disk is rotatably coupled to the sprinkler base, wherein the pour aperture receives the tongue before the shear area is broken to prevent rotation of the sprinkler disk relative to the sprinkler base, and wherein the tongue rotates downward when the shear area is broken to allow rotation of the sprinkler disk relative to the sprinkler base,
wherein the sprinkler disk comprises a plurality of sift apertures defined therethrough, wherein each of the plurality of sift apertures is smaller than the pour aperture, and wherein the plurality of sift apertures are aligned with the product dispensing opening to dispense a flowable product contained within the flowable product container.

12. A flowable product container for a flowable product, comprising:
a product canister having a canister upper end;
a sprinkler base engaging the canister upper end of the product canister to retain the flowable product within the flowable product container, the sprinkler base having a tongue defined by a shear area and a tongue hinge, wherein the tongue extends upward from the sprinkler base when the shear area is unbroken; and
a sprinkler disk having a disk body and a pour aperture defined through the disk body, wherein the disk body is rotatably coupled to the sprinkler base, wherein the pour aperture receives the tongue before the shear area is broken to prevent rotation of the sprinkler disk relative to the sprinkler base, and the tongue rotates downward when the shear area is broken to allow the rotation of the sprinkler disk relative to the sprinkler base, wherein the sprinkler base comprises a container insert cylinder extending downward and having a tapered outer wall with the container insert cylinder press fit into canister upper end of the product canister, and wherein the sprinkler base comprises a containment shoulder extending upward and encircling the sprinkler disk.

13. The flowable product container according to claim 12, wherein the containment shoulder has a shoulder outer diameter and the container insert cylinder has an insert cylinder inner diameter that is greater than the shoulder outer diameter so that the containment shoulder of a first sprinkler base is received within the container insert cylinder of a second sprinkler base when the second sprinkler base is stacked on top of the first sprinkler base.

14. The flowable product container according to claim 12, wherein the containment shoulder comprises a pair of raised portions arranged on opposite sides of the tongue.

15. The flowable product container according to claim 14, wherein the raised portions of the containment shoulder are separated by valley portions having a reduced height relative to a base top surface of the sprinkler base.

\* \* \* \* \*